United States Patent
Zhang et al.

(10) Patent No.: US 12,352,593 B2
(45) Date of Patent: Jul. 8, 2025

(54) VEHICLE POSITIONING METHOD AND SYSTEM FOR FIXED PARKING SCENARIO

(71) Applicant: NIO TECHNOLOGY (ANHUI) CO., LTD, Hefei (CN)

(72) Inventors: Heng Zhang, Shanghai (CN); Kai Zhang, Shanghai (CN); Junyi Dai, Shanghai (CN); Shiting Wang, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 191 days.

(21) Appl. No.: 17/874,988

(22) Filed: Jul. 27, 2022

(65) Prior Publication Data
US 2023/0030660 A1    Feb. 2, 2023

(30) Foreign Application Priority Data
Aug. 2, 2021    (CN) .......................... 202110880325.3

(51) Int. Cl.
*G01C 21/36*    (2006.01)
*B60W 30/06*    (2006.01)
(Continued)

(52) U.S. Cl.
CPC ..... *G01C 21/3632* (2013.01); *G01C 21/3623* (2013.01); *G06V 10/751* (2022.01);
(Continued)

(58) Field of Classification Search
CPC ............ G01C 21/3632; G01C 21/3623; G06V 10/751; G06V 20/586; B60W 30/06;
(Continued)

(56) References Cited

U.S. PATENT DOCUMENTS

| 2018/0316877 A1* | 11/2018 | Gruenke | ................... G06T 7/73 |
| 2020/0241536 A1* | 7/2020 | Liu | ....................... G05D 1/0246 |

FOREIGN PATENT DOCUMENTS

| CN | 110223348 A | * | 9/2019 | ................ G06T 7/73 |
| CN | 111862672 A | * | 10/2020 | ......... G06K 9/00812 |

(Continued)

OTHER PUBLICATIONS

Hauser Kris "Robotic Systems. Section II. Modeling Chapter 3. Coordinates and Transformations," University of Illinois at Urbana-Champaign, Jul. 26, 2021, 12 pages [retrieved online from: web.archive.org/web/20210726154813/https://motion.cs.illinois.edu/RoboticSystems/CoordinateTransformations.html].

(Continued)

*Primary Examiner* — Anne Marie Antonucci
*Assistant Examiner* — Jewel Ashley Kuntz
(74) *Attorney, Agent, or Firm* — Sheridan Ross P.C.

(57) ABSTRACT

The disclosure relates to a vehicle positioning method and system for a fixed parking scenario. The method includes: a marker detection step of detecting markers and identifying a pair of markers; a pose matching step of performing pose matching based on vehicle position information and the pair of markers; a non-pose matching step of performing non-pose matching based on the pair of markers, to obtain latest vehicle position information; and a position update step of updating current vehicle position information based on the latest vehicle position information obtained in the pose matching step or the non-pose matching step.

7 Claims, 5 Drawing Sheets

(51) Int. Cl.
*G06V 10/75* (2022.01)
*G06V 20/58* (2022.01)

(52) U.S. Cl.
CPC ........... *G06V 20/586* (2022.01); *B60W 30/06* (2013.01); *B60W 2420/403* (2013.01)

(58) Field of Classification Search
CPC ........... B60W 2420/403; B60W 40/02; B60W 2554/20; B60W 2754/10; B62D 15/0285; G05D 1/0234; G05D 1/0225
See application file for complete search history.

(56) References Cited

FOREIGN PATENT DOCUMENTS

| | | | |
|---|---|---|---|
| CN | 113112847 | 7/2021 | |
| WO | WO-2021073656 A1 * | 4/2021 | |
| WO | WO-2021102955 A1 * | 6/2021 | ............ B60W 30/06 |

OTHER PUBLICATIONS

Official Action for European Patent Application No. 22170403.4, dated Nov. 15, 2023, 13 pages.
Extended Search Report for European Patent Application No. 22170403.4, dated Oct. 17, 2022, 12 pages.
Summons to Attend Oral Proceedings for European Patent Application No. 22170403.4, dated Jun. 25, 2024, 13 pages.

* cited by examiner

VEHICLE POSITIONING METHOD AND SYSTEM FOR FIXED PARKING SCENARIO

CROSS-REFERENCE TO RELATED APPLICATION

This application claims the benefit of China Patent Application No. 202110880325.3 filed Aug. 2, 2021, the contents of which are incorporated herein by reference in its entirety.

TECHNICAL FIELD

The disclosure relates to vehicle control technologies, and in particular, to a vehicle positioning method for a fixed parking scenario and a vehicle positioning system for a fixed parking scenario.

BACKGROUND ART

Automatic parking refers to automatic parking of a vehicle into a parking space without manual control. For different automatic parking systems, different methods are generally used to detect objects around a vehicle.

Image matching aims to identify and align the content or structure with the same/similar property from two images at a pixel level. Generally speaking, images for matching are usually taken from the same or similar scenario/target, or from other types of image pairs with the same shape or semantic information.

In order to improve the robustness of a matching algorithm, reduce the impact of noise, distortion and other factors on the matching performance, and reduce the computational complexity, a feature-based image matching method has been widely studied. The feature-based image matching method in the prior art mainly includes the following steps: extracting physically significant feature structures from images, including feature points, feature lines, and salient morphological regions; and performing a matching prediction transformation function on the extracted feature structures and aligning other image content.

In the field of automatic parking, rapid positioning of vehicle position information is of great significance for vehicle path planning, and safe and intelligent driving. Image matching is a bridge between vehicle scenario information and actual map information. For the real-time performance and accuracy of image matching, obtaining three-dimensional point cloud information in a vehicle scenario for three-dimensional matching with the actual map information has become one of effective means to solve a positioning problem.

Common point cloud matching algorithms include an RANSAC algorithm and an ICP algorithm. The RANSAC algorithm may be used to robustly estimate matching model parameters, but has disadvantages that there may be a relatively large number of iterations to compute the model parameters, which consumes much time, and additional threshold parameters are required. The ICP algorithm is a point set-to-point set registration method for finding an affine transformation matrix, which can achieve accurate matching effects, but requires a very large amount of computation when searching for corresponding points.

SUMMARY OF THE DISCLOSURE

In view of the above-mentioned problems, the disclosure is intended to provide a vehicle positioning method for a fixed parking scenario (for example, a parking scenario of a parking garage, a parking scenario of a battery swap station, etc.) and a vehicle positioning system for a fixed parking scenario, which can reduce the algorithm complexity and can provide an accurate and robust positioning requirement of a vehicle in real time.

An aspect of the disclosure provides a vehicle positioning method for a fixed parking scenario. The method includes:
a marker detection step of detecting markers and identifying a pair of markers, proceeding to a following pose matching step if vehicle position information in the fixed parking scenario has been obtained, or skipping to a non-pose matching step below if the vehicle position information in the fixed parking scenario has not been obtained;
the pose matching step of performing pose matching based on the obtained vehicle position information and the identified pair of markers, and skipping to a position update step below if latest vehicle position information is obtained, otherwise proceeding to the following non-pose matching step;
the non-pose matching step of performing non-pose matching based on the identified pair of markers, to obtain the latest vehicle position information; and
the position update step of updating current vehicle position information based on the latest vehicle position information obtained in the pose matching step or the non-pose matching step,
where the vehicle position information in the marker detection step refers to vehicle location information that has been obtained by performing the vehicle positioning method in a previous time sequence.

Optionally, the pair of markers is composed of two identical markers.

Optionally, the marker detection step includes:
sub-step 1: obtaining markers based on a detection result for markers in an image or a tracking result for markers in an image that are previously detected;
sub-step 2: traversing the markers obtained in sub-step 1, finding out whether there are other markers within a certain range, and then obtaining a plurality of markers if there are other markers;
sub-step 3: determining whether there is a pair of markers in the obtained plurality of markers, and storing marker information if a condition of there being a pair of markers is satisfied; and
sub-step 4: filtering out duplicate pairs of markers from the stored marker information, to obtain at least one pair of markers as a pair of markers in a ground coordinate system.

Optionally, in sub-step 3, determining whether there is a pair of markers is implemented by way of:
computing a distance between center points of two markers and an angle between directions of the markers, determining whether the distance between the center points of the two markers and the angle between the directions of the two markers satisfy specified thresholds, and determining that the two markers are a pair of markers if the distance and the angle satisfy the preset specified thresholds.

Optionally, in sub-step 4, the duplicate pairs of markers are filtered out based on the distance between the center points of the pair of markers and the angle between the directions of the pair of markers, to obtain the pair of markers in the ground coordinate system.

Optionally, the non-pose matching step includes:
matching the obtained pairs of markers in the ground coordinate system successively with pairs of actual markers in a known fixed scenario coordinate system; and
selecting a pair of markers with optimal matching as a matched pair of markers, and obtaining vehicle position information based on the matched pair of markers and then using the vehicle position information as the latest vehicle position information.

Optionally, the matching the obtained pairs of markers in the ground coordinate system successively with pairs of actual markers in a known fixed scenario coordinate system includes:
performing a coordinate system transformation matrix for the obtained pairs of markers in the ground coordinate system by solving an ICP algorithm by means of SVD decomposition, computing corresponding positions, in the fixed scenario coordinate system, of the pairs of markers in the ground coordinate system, and obtaining distance differences between the corresponding positions and the pairs of actual markers in the known fixed scenario coordinate system,
where selecting a pair of markers with optimal matching refers to selecting a pair of markers with a minimum distance difference.

Optionally, the non-pose matching step includes:
a coarse matching sub-step of matching the obtained pairs of markers in the ground coordinate system with pairs of actual markers in a known fixed scenario coordinate system, and performing a coordinate system transformation matrix by solving an ICP algorithm by means of SVD decomposition, to obtain a first transformation matrix and a first error;
a fine matching sub-step of performing an inverse operation on the first transformation matrix obtained in the coarse matching sub-step, to find corresponding pairs of virtual markers, in the ground coordinate system, of the pairs of actual markers in the fixed scenario coordinate system, filtering out matched pairs of virtual markers from the obtained pairs of virtual markers, and computing another transformation matrix for other unmatched pairs of virtual markers and matched pairs of markers in the ground coordinate system, to obtain a second transformation matrix and a second error; and
a selection sub-step of selecting, based on the first transformation matrix and the first error that are obtained in the coarse matching sub-step and the second transformation matrix and the second error that are obtained in the fine matching sub-step, a pair of markers from the transformation matrix with a small error as a matched pair of markers, and obtaining, based on the matched pair of markers, vehicle position information in a fixed scenario coordinate system as the latest vehicle position information.

Optionally, the pose matching step includes:
(a) obtaining a coordinate system transformation matrix from the ground coordinate system to the fixed scenario coordinate system based on the vehicle position information; and
(b) computing, based on the coordinate system transformation matrix obtained in (a), corresponding positions, in the fixed scenario coordinate system, of the pairs of markers in the ground coordinate system, matching the corresponding positions with pairs of actual markers in a known fixed scenario coordinate system, and then using a position of a matched pair of markers in the fixed scenario coordinate system as the latest vehicle position information if a matching error is less than a preset matching threshold.

An aspect of the disclosure provides a vehicle positioning system for a fixed parking scenario. The system includes:
a marker detection module configured to detect markers and identify a pair of markers;
a pose matching module configured to perform pose matching based on vehicle position information and the pair of markers;
a non-pose matching module configured to perform non-pose matching based on the pair of markers, to obtain latest vehicle position information; and
a position update module configured to update current vehicle position information based on the latest vehicle position information obtained by the pose matching module or the non-pose matching module.

Optionally, the pair of markers is composed of two identical markers.

Optionally, the marker detection module includes:
a detection sub-module configured to obtain markers based on a detection result for markers in an image or a tracking result for markers hat are previously detected;
a traverse sub-module configured to traverse the markers obtained by the detection sub-module, find out whether there are other markers within a certain range, and then obtain a plurality of markers if there are other markers;
a determination sub-module configured to determine whether there is a pair of markers in the plurality of markers obtained by the traverse sub-module, and store marker information if there is a pair of markers; and
a filtering sub-module configured to filter out duplicate pairs of markers from the marker information obtained by the determination sub-module, to obtain at least one pair of markers as a pair of markers in a ground coordinate system.

Optionally, in the determination sub-module, determining whether there are two markers that form a pair of markers is implemented by way of:
computing a distance between center points of two markers and an angle between directions of the markers, determining whether the distance between the center points of the two markers and the angle between the directions of the two markers satisfy specified thresholds, and determining that the two markers are a pair of markers if the distance and the angle satisfy the preset specified thresholds.

Optionally, the filtering sub-module filters out the duplicate pairs of markers based on the distance between the center points of the pairs of markers and the angle between the directions of the pair of markers, to obtain the pair of markers in the ground coordinate system.

Optionally, the non-pose matching module includes:
a matching sub-module configured to match the obtained pairs of markers in the ground coordinate system successively with pairs of actual markers in a known fixed scenario coordinate system; and
a selection sub-module configured to select a pair of markers with optimal matching as a matched pair of markers, and obtain vehicle position information based on the matched pair of markers and then use the vehicle position information as the latest vehicle position information.

Optionally, the matching sub-module performs a coordinate system transformation matrix for the obtained pairs of markers in the ground coordinate system by solving an ICP algorithm by means of SVD decomposition, computes corresponding positions, in the fixed scenario coordinate system, of the pairs of markers in the ground coordinate system, and obtains distance differences between the corresponding positions and the pairs of actual markers in the known fixed scenario coordinate system, where selecting, by the selection sub-module, a pair of markers with optimal matching refers to selecting a pair of markers with a minimum distance difference.

Optionally, the non-pose matching module includes:

a coarse matching sub-module configured to match the obtained pairs of markers in the ground coordinate system with pairs of actual markers in a known fixed scenario coordinate system, and perform a coordinate system transformation matrix by solving an ICP algorithm by means of SVD decomposition, to obtain a first transformation matrix and a first error;

a fine matching sub-module configured to perform an inverse operation on the first transformation matrix obtained by the coarse matching sub-module, to find corresponding pairs of virtual markers, in the ground coordinate system, of the pairs of actual markers in the fixed scenario coordinate system, filter out matched pairs of virtual markers from the obtained pairs of virtual markers, and compute another transformation matrix for other unmatched pairs of virtual markers and matched pairs of markers in the ground coordinate system, to obtain a second transformation matrix and a second error; and a selection sub-module configured to select, based on the first transformation matrix and the first error that are obtained by the coarse matching sub-module and the second transformation matrix and the second error that are obtained by the fine matching sub-module, a pair of markers from the transformation matrix with a small error as a matched pair of markers, and obtain, based on the matched pair of markers, vehicle position information in a fixed scenario coordinate system as the latest vehicle position information.

Optionally, the pose matching module includes:

a transformation sub-module configured to obtain a coordinate system transformation matrix from the ground coordinate system to the fixed scenario coordinate system based on the vehicle position information; and a matching sub-module configured to compute, based on the coordinate system transformation matrix obtained by the transformation sub-module, corresponding positions, in the fixed scenario coordinate system, of the pairs of markers in the ground coordinate system, match the corresponding positions with pairs of actual markers in a known fixed scenario coordinate system, and then use a position of a matched pair of markers in the fixed scenario coordinate system as the latest vehicle position information if a matching error is less than a preset matching threshold.

An aspect of the disclosure provides a computer-readable medium having a computer program stored thereon, where when the computer program is executed by a processor, the vehicle positioning method for a fixed parking scenario is implemented.

An aspect of the disclosure provides a computer device, which includes a storage module, a processor, and a computer program stored on the storage module and executable on the processor, where the processor implements the vehicle positioning method for a fixed parking scenario when executing the computer program.

An aspect of the disclosure provides a vehicle, which includes the vehicle positioning system for a fixed parking scenario according to any one in the foregoing.

DETAILED DESCRIPTION OF EMBODIMENTS

Figure 1:
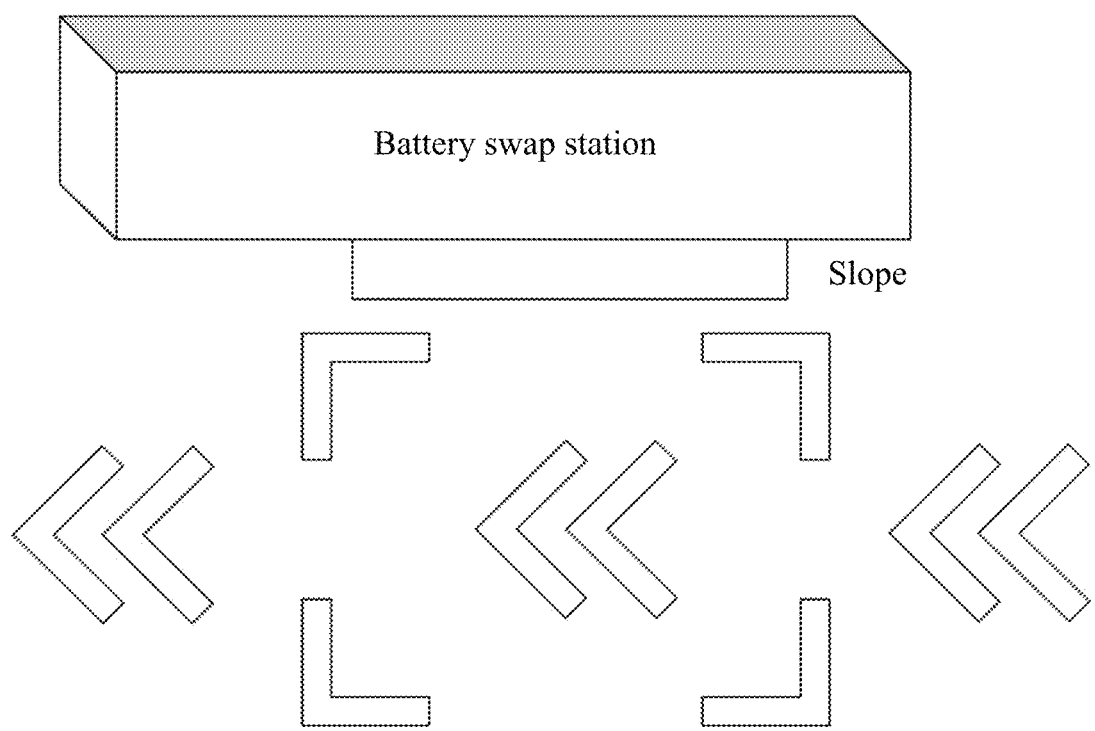
FIG. 1 is a schematic diagram of markers in a vehicle positioning method in a battery swap station scenario according to an implementation.

Some of the embodiments of the disclosure are described below and are intended to provide a basic understanding of the disclosure. They are not intended to confirm key or decisive elements of the disclosure or limit the scope of protection.

For concise and illustrative purposes, this specification mainly describes the principles of the disclosure with reference to its exemplary embodiments. However, those skilled in the art will readily recognize that the same principles can be equivalently applied to all types of vehicle positioning methods for a fixed parking scenario and vehicle positioning systems for a fixed parking scenario, and the same principles can be implemented therein. Any such changes do not depart from the true spirit and scope of this patent application.

In addition, in the following description, reference is made to the accompanying drawings, which illustrate specific exemplary embodiments. Electrical, mechanical, logical, and structural changes can be made to these embodiments without departing from the spirit and scope of the disclosure. Furthermore, although the features of the disclosure are disclosed in combination with only one of several implementations/embodiments, if any given or recognizable function may be desired and/or advantageous, this feature can be combined with one or more other features of other implementations/embodiments. Therefore, the following description should not be considered in a limiting sense, and the scope of the disclosure is defined by the appended claims and their equivalents.

The terms such as "have" and "include" indicate that in addition to the units (modules) and steps that are directly and clearly described in the specification and the claims, other units (modules) and steps that are not directly or clearly described are not excluded in the technical solutions of the disclosure.

The disclosure is intended to provide a method for auxiliary positioning by means of markers within a certain region of a fixed parking scenario based on a visual perception capability. Effects to be achieved by the disclosure mainly include: there is no strict limitation on a scenario and an initial vehicle posture as well as a parking path, thereby providing a certain degree of flexibility; and only ground markers need to be matched, which greatly reduces the algorithm complexity, such that an accurate and robust positioning requirement of a vehicle can be provided in real time.

In order to achieve the above technical effects, especially in order to enable quick and accurate matching, the disclosure proposes to enable quick matching on the basis of setting specific markers and by improving a visual perception positioning algorithm, that is, by improving an ICP algorithm, such that positioning information of a vehicle can be provided in real time within a certain region of a fixed parking scenario.

As an implementation of the fixed parking scenario, a scenario of parking outside a battery swap station is used as an example for description. The fixed parking scenario can not only be suitable for parking outside the battery swap station, and can also be suitable for parking in a parking lot and other fixed scenarios.

FIG. 1 is a schematic diagram of markers in a vehicle positioning method in a battery swap station scenario according to an implementation.

As shown in FIG. 1, for example, several single-right-angle-shaped markers and several double-right-angle-shaped markers are set outside a battery swap station. These markers exemplified in FIG. 1 are planar markers, and definitely, the markers of the disclosure may also be implemented as spatial markers.

A pair of markers is composed of two identical markers. In the disclosure, a pair of markers specifically refers to two parallel markers, a distance between which is within a certain range, which can form a pair of markers. Referring to FIG. 1, in the ground markers of FIG. 1, two markers on the left outside a parking space form a pair of markers, two markers in the middle of the parking space form a pair of markers, and two markers on the right outside the parking space form a pair of markers.

With regard to positions at which the planar marker and the spatial marker are set, the planar marker includes one or a combination of the following: a positioning marker set on a ground side of the fixed parking scenario; a positioning marker set on a peripheral side of the fixed parking scenario; and a positioning marker set on an upper side of the fixed parking scenario. In addition, the spatial marker includes one or a combination of the following: a positioning marker set on a ground side of the fixed parking scenario; a positioning marker set on a peripheral side of the fixed parking scenario; and a positioning marker set on an upper side of the fixed parking scenario.

With regard to shapes of the planar marker and the spatial marker, the planar marker is one or a combination of the following: an arrow-shaped marker; a single-right-angle-shaped marker; a triangle marker; and a polygon marker. In addition, the spatial marker is one or a combination of the following: a two-dimensional code marker; an arrow-shaped marker; a single-right-angle-shaped marker; a triangle marker; a polygon marker; and objects that are originally set in the fixed parking scenario. The so-called "objects that are originally set in the fixed parking scenario" here refer to objects that are inherent in the fixed parking scenario (such as in the battery swap station) in addition to the additionally pasted markers, such as a front V-shaped groove, a rear planar groove, and a warning sticker to provide a warning to users.

Figure 2:
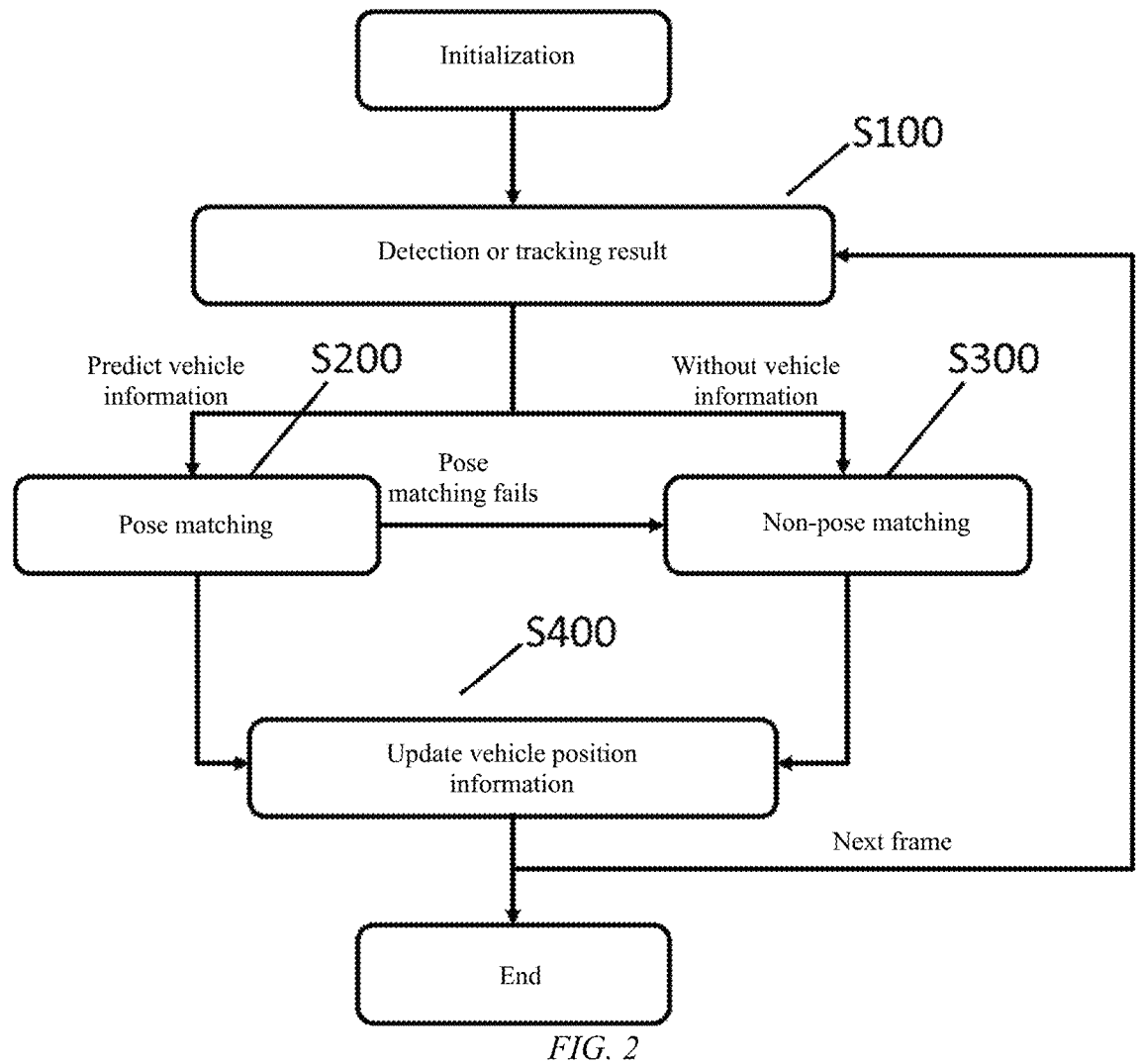
FIG. 2 is a schematic flowchart of a vehicle positioning method in a battery swap station scenario according to an implementation.

FIG. 2 is a schematic flowchart of a vehicle positioning method in a battery swap station scenario according to an implementation.

As shown in FIG. 2, the vehicle positioning method in a battery swap station scenario according to an implementation includes the following steps:

step S100: after initialization, obtaining a detection result or a tracking result for markers, preferably, further filtering out some too large or too small markers based on size information, and proceeding to step S200 if vehicle position information has been obtained, or proceeding to step S300 if the vehicle position information has not been obtained;

step S200: performing pose matching based on the vehicle position information, and skipping to step S400 if pose matching succeeds, or proceeding to step S300 if pose matching fails;

step S300: performing non-pose matching based on the markers; and step S400: updating the vehicle position information based on a result for pose matching or non-pose matching, predicting a next frame of vehicle position information in combination with a vehicle odometry based on the vehicle position information obtained through matching, and repeating step S100.

With regard to the vehicle position information, there is no vehicle position information at first from the perspective of a time sequence. However, position information of the vehicle in a ground coordinate system is obtained based on a positioning result, and then, current frame matching can be performed based on the previous matching result and a result from the odometer during subsequent positioning, that is to say, "pose matching" is performed.

Here, before describing specific steps of the disclosure, the process of solving an ICP algorithm by means of SVD decomposition in the prior art is briefly described.

Singular value decomposition (SVD for short) is an algorithm widely applied in the field of machine learning. SVD is an important decomposition of a matrix in linear algebra, and is a generalization of eigendecomposition on any matrix.

The iterative closest points (ICP) algorithm is mainly used for the matching of three-dimensional objects, which can be understood as: given two three-dimensional data point sets from different coordinate systems, finding a spatial transformation of the two point sets, so that they can be spatially matched.

The process of solving the ICP algorithm by means of SVD decomposition includes the following steps:

for two sets of matching points $P=\{p_1, p_2, \ldots p_n\}$ and $Q=\{q_1, q_2, ?? q_n\}$, where $p_i, q_i \in R^d$ is a spatially matching point set, and a rotation matrix R and a translation vector t are computed by using the ICP algorithm, such that an error between the transformed point set and a target point set is minimized, the formula is as follows:

$$(R, t) = \underset{R \in SO(d), t \in R^d}{\mathrm{argmin}} \sum_{i=1}^{n} \omega_L \|(Rp_L + t) - q_t\|^2$$

step 1: computing a weighted center of two sets of matching points:

$$\overline{p} = \frac{\sum_{i=1}^{n} \omega_i p_i}{\sum_{i=1}^{n} \omega_i}, \overline{q} = \frac{\sum_{i=1}^{n} \omega_i q_i}{\sum_{i=1}^{n} \omega_i}$$

step 2: obtaining a decentralized point set:

$x_i = p_i - \bar{p}, y_i = q_i - \bar{q}, i = 1, 2, \ldots, n$ step 3: computing a covariance matrix of d×d:

$$S = XWY^T$$

where X, Y is a d×n matrix, $x_i$, $y_i$ are respectively column elements of the matrix, and $W = \text{diag}(\omega_1, \omega_2, \ldots, \omega_n)$ step 4: performing SVD decomposition on S, $S = U\Sigma Y^T$, to obtain the rotation matrix R:

$$R = V \begin{pmatrix} 1 & & & \\ & \ddots & & \\ & & 1 & \\ & & & \det(VU^T) \end{pmatrix} U^T$$

and step 5: computing an amount of translation:

$t = \bar{q} - R\bar{p}$

A transformation matrix (R, t) is computed by using the above steps. However, directly searching for matching points here consumes much time and leads to a relatively large amount of computation. In order to solve this technical problem, in the disclosure, special pairs of markers as shown in FIG. 1 are first designed, a distance and directions of markers are computed based on a detection or tracking result for the markers during a non-pose matching process, to determine pairs of markers, and matching is performed between the determined pairs of markers and pairs of actual markers in a map, to obtain an optimal matching result.

In the disclosure, the use of the pairs of markers for matching can reduce the amount of computation, because, for example, in FIG. 1, there are only three pairs of markers, and in this case, matching of a presumptively matched pair of markers in the map based on the detected markers is much less computationally expensive than traversing matched points. For example, if four pairs of markers are detected, in terms of the amount of computation, a coordinate transformation matrix is computed at most 4*3=12 times, with a faster computation speed, instead of performing a large number of computations on obtained point positions in the ICP algorithm. During a matching process, if a detection result is good in practical applications, the number of detected pairs of markers is generally similar to the number of pairs of actual markers in a map.

Next, a process of how to obtain a pair of markers in the disclosure will be described.

The process of obtaining a pair of markers includes the following steps:

step S1: performing filtering on markers in an image detection result and a sequential frame tracking result based on size information of the markers, to filter out too large or too small markers, where the image detection result is a result obtained by detecting the markers in an image, the sequential frame tracking is a result obtained by tracking the previously detected markers, and there may be a case where some markers overlap;

step S2: traversing the markers obtained in step S1, finding out whether there are other markers within a certain range, and proceeding to step S3 if yes (obtaining a plurality of markers if there are other markers), otherwise continuing traverse in step S2;

step S3: computing a distance between center points of two markers and an angle between directions of the markers, where the direction of the marker is defined as a sum of vectors from two end points of the marker to the center point, and a sum vector is then normalized, determining whether the distance between the center points of the two markers and the angle between the directions of the two markers satisfy certain thresholds, finding a pair of markers if yes, and storing information of the pair of markers; and step S4: filtering the obtained information of the pair of markers, to filter out some duplicate pairs of markers based on information about the distance and the angle between the directions of the pair of markers (since the tracking result is not exactly the same as the detection result, which may result in one marker and a plurality of markers forming a pair), and finally obtaining at least one pair of markers, including where there is only one pair of markers, and also including where there are a plurality of pairs of markers and matching with all the pairs of markers is then performed to find a pair of markers with a minimum matching error therefrom.

In this implementation, there are two coordinate systems: a ground coordinate system (which may also be referred to as an image coordinate system); and a battery swap station coordinate system (which may also be referred to as a map coordinate system, and corresponds to the "fixed scenario coordinate system" in the claims).

Here, the "ground coordinate system" represents a traditional image coordinate system, which is a two-dimensional coordinate system constructed with a top-left corner of an image as an origin, in pixels. The "battery swap station coordinate system" represents a coordinate system in an actual 3D scenario with a certain position of a battery swap station as an origin, in meters, for example.

Specific content of non-pose matching and pose matching will be described below.

1. Non-pose matching includes the following steps:
   (a) finding, from markers, pairs of markers that can be paired (i.e., pairs of markers in the ground coordinate system);
   (b) traversing the pairs of markers obtained in (a), sequentially matching the pairs of markers in the ground coordinate system with pairs of actual markers (i.e., pairs of actual markers in the battery swap station coordinate system), which specifically involves obtaining a coordinate system transformation matrix by solving an ICP algorithm by means of SVD decomposition, and computing distance differences between the pairs of actual markers (i.e., the pairs of actual markers in the battery swap station coordinate system) and the pairs of markers converted into the battery swap station coordinate system through the transformation matrix (where if not matched, a distance between a pair of markers is represented by a larger number, instead); and
   (c) making a selection of optimal matching (i.e., with the minimum distance difference) from (b), and if the optimal matching satisfies a preset matching threshold, this indicating that non-pose matching is completed, and then updating position information of a vehicle in the battery swap station coordinate system based on a matched pair of markers, or if the optimal matching does not satisfy the preset matching threshold, this indicating that no pair of actual markers is matched, and then waiting for subsequent sequential frames for matching.

2. Pose matching includes the following steps:
   (a) obtaining a coordinate system transformation matrix based on vehicle position information; and
   (b) updating the vehicle position information based on a matched pair of markers if a matching effect of the matrix that is obtained in (a) is good (that is, where a distance difference satisfies a preset matching threshold), otherwise performing non-pose matching.

In (a), as an example, the vehicle position information here refers to position information of center points of front and rear axles of a vehicle in the battery swap station coordinate system. Since coordinates of the front and rear axles of the vehicle in an image are fixed, a transformation matrix from the coordinates of the front and rear axles of the vehicle in the image to coordinates of the front and rear axles of the vehicle in the battery swap station coordinate system, that is, a transformation matrix from the ground coordinate system to the battery swap station coordinate system, can be computed.

In (b), the coordinate transformation matrix is obtained based on (a). Corresponding positions of pairs of markers after being transformed into the battery swap station coordinate system are computed, and the corresponding positions of the pairs of markers in the battery swap station coordinate system are compared with pairs of actual markers in the battery swap station coordinate system. If a matching error is less than a preset matching threshold, which indicates that the vehicle position information is relatively accurate, then an error in a comparison and matching result only needs to be computed once, without the need to perform further matching on markers, and the vehicle position information can be updated based on the position of a matched pair of actual markers in the battery swap station coordinate system. If the matching error is greater than the preset matching threshold, which indicates current vehicle position information is inaccurate, then non-pose matching is performed.

Further, a transformation example of non-pose matching will be described.

Figure 3:
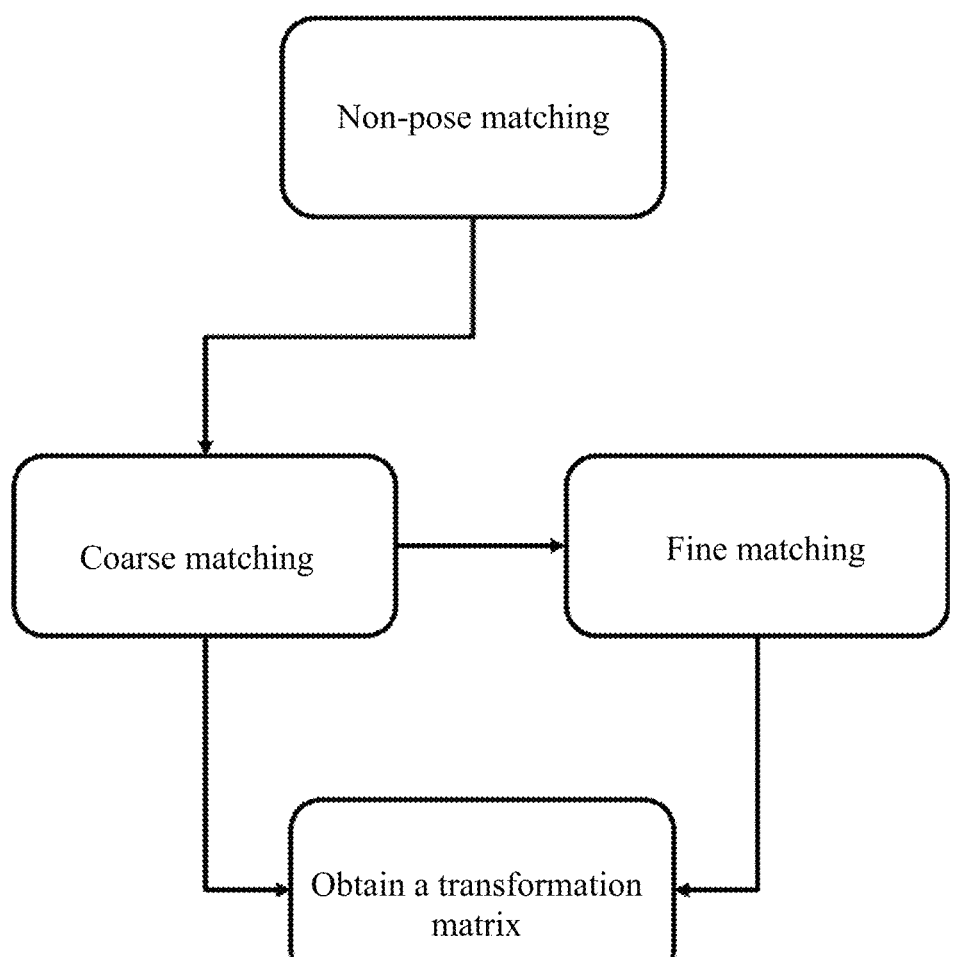
FIG. 3 is a schematic diagram of a specific flow of a transformation example of a non-pose matching step.

FIG. 3 is a schematic diagram of a specific flow of a transformation example of non-pose matching.

In this example, non-pose matching can be divided into a coarse matching process and a fine matching process.

As shown in FIG. 3, non-pose matching in this transformation example includes:

(1) Coarse Matching:
  matching pairs of markers in the ground coordinate system with pairs of actual markers (i.e., pairs of actual markers in the battery swap station coordinate system), to obtain a first transformation matrix $RT_1$ (a transformation matrix from the ground coordinate system to the battery swap station coordinate system) and thus a first error $cost_1$;

(2) Fine Matching:
  (a) performing an inverse operation on the transformation matrix $RT_1$ obtained through coarse matching, to find corresponding virtual markers, in the ground coordinate system, of the pairs of actual markers in a map (i.e., the pairs of actual markers in the battery swap station coordinate system) in this case; and
  (b) filtering out, from the pairs of virtual markers obtained in (a), matched pairs of markers that are detected or tracked, and then computing another transformation matrix for other unmatched pairs of map markers (i.e., pairs of virtual markers) and the matched pairs of markers that are detected or tracked, to obtain a second transformation matrix $RT_2$ and a second error $cost_2$;

and (3) based on the first error $cost_1$ and the second error $cost_2$ in processes (1) and (2), selecting the transformation matrix corresponding to the one with a smaller error as a final transformation matrix.

In this example, a reason for performing coarse matching and fine matching is that during matching of actually detected or tracked markers based on the coordinate transformation matrix, but real markers in a map (i.e., the actual markers in the battery swap station coordinate system) may not be exactly matched due to matching errors. In this case, unmatched real markers in the map (i.e., actual markers in the battery swap station coordinate system) are inversely transformed into "virtual markers" (i.e., the markers in the ground coordinate system) in an image by means of the coordinate transformation matrix, where the "virtual markers" are not detected or tracked, but hypothetical, and the "virtual markers" are then supplemented into the matched pair of image marker-actual map marker, to form a set of matching pairs of markers. The matching pairs of markers are specifically represented as: (1) a matching pair of image marker (i.e., marker in the ground coordinate system)-actual map marker (i.e., actual marker in the battery swap station coordinate system); and (2) a matching pair of virtual marker-actual map marker (i.e., actual marker in the battery swap station coordinate system). Based on such new matching pairs of markers, a coordinate transformation matrix is recomputed for transformation matrix updating.

Since the transformation matrix is computed by means of SVD decomposition, more matching points generally mean that a better transformation matrix can be obtained. In addition, since a detection or tracking result is not completely accurate, the matched pairs of markers can be supplemented to a certain extent by inversely computing the positions of the pairs of map markers in the ground coordinate system. Here, coarse-to-fine matching is a further optimization method to improve matching accuracy.

Next, the vehicle positioning system for a fixed parking scenario of the disclosure will be described.

Figure 4:
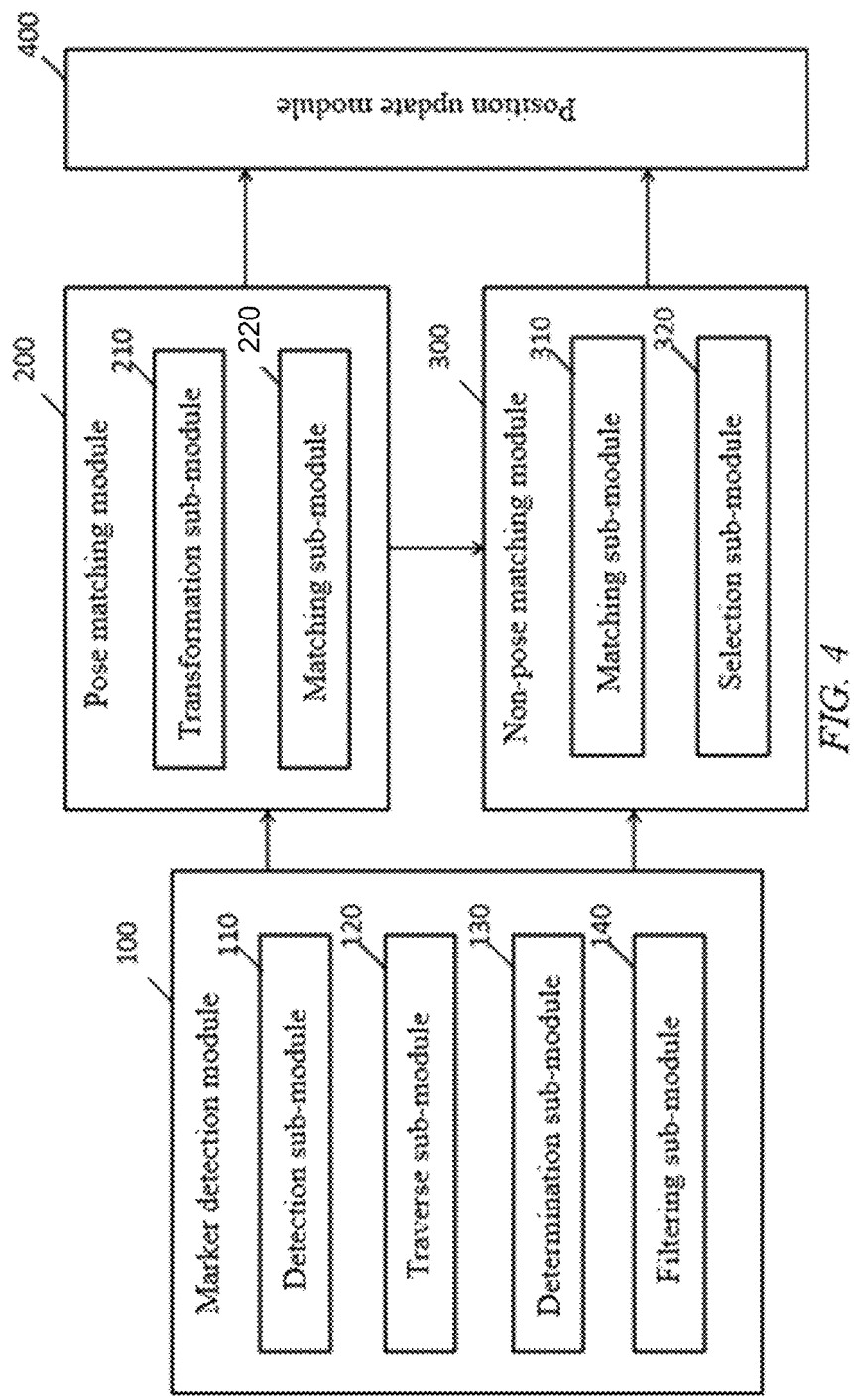
FIG. 4 is a schematic structural diagram of a vehicle positioning system for a fixed parking scenario according to an implementation.

FIG. 4 is a schematic structural diagram of a vehicle positioning system for a fixed parking scenario according to an implementation.

As shown in FIG. 4, the vehicle positioning system for a fixed parking scenario of the disclosure includes:
  a marker detection module 100 configured to detect markers and identify a pair of markers;
  a pose matching module 200 configured to perform pose matching based on vehicle position information and the pair of markers;
  a non-pose matching module 300 configured to perform non-pose matching based on the pair of markers, to obtain latest vehicle position information; and
  a position update module 400 configured to update current vehicle position information based on the latest vehicle position information obtained by the pose matching module or the non-pose matching module.

The pair of markers is composed of two identical markers.
Further, the marker detection module 100 includes:
  a detection sub-module 110 configured to obtain markers based on a detection result for markers in an image or a tracking result for markers that are previously detected;
  a traverse sub-module 120 configured to traverse the markers obtained by the detection sub-module, find out whether there are other markers within a certain range, and then obtain a plurality of markers if there are other markers;
  a determination sub-module 130 configured to determine whether there is a pair of markers in the plurality of markers obtained by the traverse sub-module, and store marker information if there is a pair of markers; and a filtering sub-module 140 configured to filter out duplicate pairs of markers from the marker information obtained by the determination sub-module, to obtain at least one pair of markers as a pair of markers in a ground coordinate system.

In the determination sub-module 130, determining whether there are two markers that form a pair of markers is implemented by way of: computing a distance between center points of two markers and an angle between directions of the markers, determining whether the distance between the center points of the two markers and the angle between the directions of the two markers satisfy specified thresholds, and determining that the two markers are a pair of markers if the distance and the angle satisfy the preset specified thresholds.

The filtering sub-module 140 filters out the duplicate pairs of markers based on the distance between the center points of the pairs of markers and the angle between the directions of the pair of markers, to obtain the pair of markers in the ground coordinate system.

Further, the pose matching module 200 includes:

a transformation sub-module 210 configured to obtain a coordinate system transformation matrix from the ground coordinate system to the fixed scenario coordinate system based on the vehicle position information; and a matching sub-module 220 configured to compute, based on the coordinate system transformation matrix obtained by the transformation sub-module, corresponding positions, in the fixed scenario coordinate system, of the pairs of markers in the ground coordinate system, match the corresponding positions with pairs of actual markers in a known fixed scenario coordinate system, and then use a position of a matched pair of markers in the fixed scenario coordinate system as the latest vehicle position information if a matching error is less than a preset matching threshold.

In another aspect, if the matching error in the matching sub-module 220 is greater than the preset matching threshold, which indicates that the current vehicle position information is inaccurate, then the non-pose matching module 300 performs non-pose matching.

Further, the non-pose matching module 300 includes:

a matching sub-module 310 configured to match the obtained pairs of markers in the ground coordinate system successively with pairs of actual markers in a known fixed scenario coordinate system; and a selection sub-module 320 configured to select a pair of markers with optimal matching as a matched pair of markers, and obtain vehicle position information based on the matched pair of markers and then use the vehicle position information as the latest vehicle position information.

The matching sub-module 310 performs a coordinate system transformation matrix for the obtained pair of markers in the ground coordinate system by solving an ICP algorithm by means of SVD decomposition, computes corresponding positions, in the fixed scenario coordinate system, of the pairs of markers in the ground coordinate system, and obtains distance differences between the corresponding positions and the pairs of actual markers in the known fixed scenario coordinate system. Selecting, by the selection sub-module 320, a pair of markers with optimal matching refers to selecting a pair of markers with a minimum distance difference.

Next, another transformation example of the non-pose matching module will be described.

Figure 5:
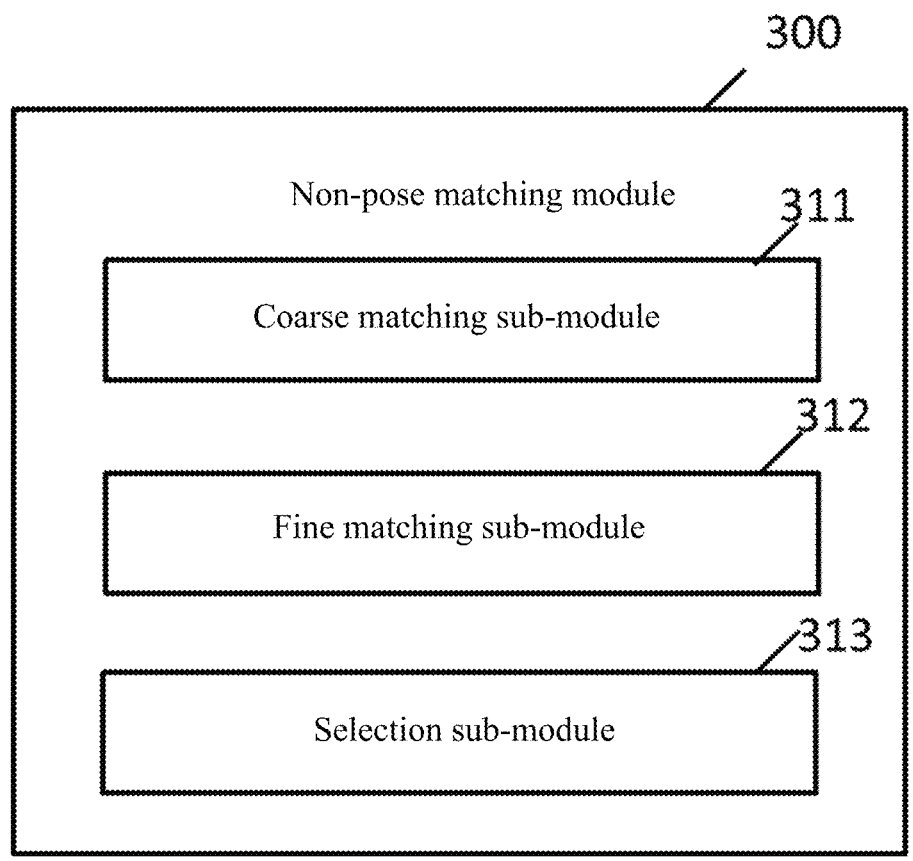
FIG. 5 is a schematic structural diagram of a transformation example of a non-pose matching module.

FIG. 5 is a schematic structural diagram of a transformation example of a non-pose matching module.

As shown in FIG. 5, in the transformation example of the non-pose matching module, the non-pose matching module 300 includes:

a coarse matching sub-module 311 configured to match the obtained pairs of markers in the ground coordinate system with pairs of actual markers in a known fixed scenario coordinate system, and perform a coordinate system transformation matrix by solving an ICP algorithm by means of SVD decomposition, to obtain a first transformation matrix and a first error;

a fine matching sub-module 312 configured to perform an inverse operation on the first transformation matrix obtained by the coarse matching sub-module, to find corresponding pairs of virtual markers, in the ground coordinate system, of the pairs of actual markers in the fixed scenario coordinate system, filter out matched pairs of virtual markers from the obtained pairs of virtual markers, and compute another transformation matrix for other unmatched pairs of virtual markers and matched pairs of markers in the ground coordinate system, to obtain a second transformation matrix and a second error; and a selection sub-module 313 configured to select, based on the first transformation matrix and the first error that are obtained by the coarse matching sub-module and the second transformation matrix and the second error that are obtained by the fine matching sub-module, a pair of markers from the transformation matrix with a small error as a matched pair of markers, and obtain, based on the matched pair of markers, vehicle position information in a fixed scenario coordinate system as the latest vehicle position information.

As described above, according to the vehicle positioning method for a fixed parking scenario and the vehicle positioning system for a fixed parking scenario of the disclosure, fast and accurate matching can be implemented, particularly by improving the ICP algorithm on the basis of using specific markers (i.e., pairs of markers), such that fast matching of the specific markers can be implemented, and positioning information of a vehicle can be provided in real time within a certain planar region outside a battery swap station.

In addition, in the vehicle positioning method for a fixed parking scenario and the vehicle positioning system for a fixed parking scenario of the disclosure, the use of specific markers for positioning has relatively high flexibility and imposes no limitation on a parking path. In combination with a matched pair of ground markers and pairs of actual markers in a known map (for example, a map delivered from a cloud), the position of the vehicle in the battery swap station coordinate system is computed, thereby achieving the purpose of real-time vehicle positioning.

The vehicle positioning method and the vehicle positioning system in a battery swap station scenario are presented above. Definitely, the vehicle positioning method for a fixed parking scenario and the vehicle positioning system for a fixed parking scenario of the disclosure are not only suitable for a battery swap station scenario, and can also be suitable for other fixed parking scenarios, such as a parking garage scenario.

The disclosure further provides a computer-readable medium having a computer program stored thereon, where when the computer program is executed by a processor, the above-mentioned vehicle positioning method for a fixed parking scenario is implemented.

The disclosure further provides a computer device, which includes a storage module, a processor, and a computer program stored on the storage module and executable on the processor, where the processor implements the above-mentioned vehicle positioning method for a fixed parking scenario when executing the computer program.

The disclosure further provides a vehicle, which includes the vehicle positioning system for a fixed parking scenario as described above.

The foregoing examples mainly describe the vehicle positioning method for a fixed parking scenario and the vehicle positioning system for a fixed parking scenario of the disclosure. Although only some specific implementations of the disclosure are described, a person of ordinary skill in the art should understand that the disclosure may be implemented in many other forms without departing from the essence and scope of the disclosure. Accordingly, the presented examples and implementations are considered to be illustrative rather than restrictive, and the disclosure may encompass various modifications and replacements without departing from the spirit and scope of the disclosure that are defined by the appended claims.

The invention claimed is:

1. A vehicle positioning method for a fixed parking scenario, the method comprising:
    a marker detection step of detecting markers and identifying a pair of markers, proceeding to a pose matching step if vehicle position information of a vehicle in the fixed parking scenario has been obtained, or skipping to a non-pose matching step if the vehicle position information in the fixed parking scenario has not been obtained, wherein the vehicle position information comprises a point on an axle of the vehicle in a known fixed scenario coordinate system;
    the pose matching step of performing pose matching based on the obtained vehicle position information and the identified pair of markers, and skipping to a position update step if latest vehicle position information is obtained based on pose matching, otherwise proceeding to the non-pose matching step;
    the non-pose matching step of performing non-pose matching based on the identified pair of markers, to obtain the latest vehicle position information;
    the position update step of updating current vehicle position information based on the latest vehicle position information obtained in the pose matching step or the non-pose matching step; and
    a parking control step of controlling automatic parking for the vehicle using the updated current vehicle position information,
    wherein the vehicle position information in the marker detection step refers to vehicle location information that has been obtained by performing the vehicle positioning method in a previous time sequence,
    wherein the marker detection step comprises filtering out duplicate pairs of markers from stored marker information, to obtain the identified pair of markers in a ground coordinate system, and
    wherein the non-pose matching step comprises:
        a coarse matching sub-step of matching the identified pair of markers in the ground coordinate system with pairs of actual markers in the known fixed scenario coordinate system, and performing a coordinate system transformation matrix by solving an ICP algorithm by means of SVD decomposition, to obtain a first transformation matrix and a first error;
        a fine matching sub-step of performing an inverse operation on the first transformation matrix obtained in the coarse matching sub-step, to find corresponding pairs of virtual markers, in the ground coordinate system, of the pairs of actual markers in the known fixed scenario coordinate system, filtering out matched pairs of virtual markers from the corresponding pairs of virtual markers, and computing another transformation matrix for other unmatched pairs of virtual markers and matched pairs of markers in the ground coordinate system, to obtain a second transformation matrix and a second error; and
        a selection sub-step of selecting, based on the first transformation matrix and the first error that are obtained in the coarse matching sub-step and the second transformation matrix and the second error that are obtained in the fine matching sub-step, a pair of markers from the transformation matrix with a small error as a matched pair of markers, and obtaining, based on the matched pair of markers, vehicle position information in the fixed scenario coordinate system as the latest vehicle position information.

2. The vehicle positioning method for a fixed parking scenario according to claim 1, wherein the marker detection step comprises:
    obtaining markers based on a detection result for markers in an image or a tracking result for markers in an image that are previously detected;
    traversing the obtained markers to find out whether there are other markers within a certain range, and then obtaining a plurality of markers if there are other markers; and
    determining whether there is a pair of markers in the obtained plurality of markers, and storing marker information as the stored marker information if a condition of there being a pair of markers is satisfied.

3. The vehicle positioning method for a fixed parking scenario according to claim 1, wherein the pose matching step comprises:
    (a) obtaining a coordinate system transformation matrix from the ground coordinate system to the fixed scenario coordinate system based on the vehicle position information; and
    (b) computing, based on the coordinate system transformation matrix obtained in (a), corresponding positions, in the fixed scenario coordinate system, of pairs of markers in the ground coordinate system, matching the corresponding positions with the pairs of actual markers in the known fixed scenario coordinate system, and then using a position of a matched pair of markers in the fixed scenario coordinate system as the latest vehicle position information if a matching error is less than a preset matching threshold.

4. A vehicle positioning system for a fixed parking scenario, the vehicle positioning system comprising:
    a computer readable medium comprising a computer program stored thereon; and
    a processor to execute the computer program to:
        detect markers and identify a pair of markers;
        perform pose matching based on vehicle position information of a vehicle and the identified pair of markers, wherein the vehicle position information comprises a point on an axle of the vehicle in a known fixed scenario coordinate system;

in the absence of the vehicle position information, perform non-pose matching based on the identified pair of markers, to obtain latest vehicle position information;

update current vehicle position information based on the latest vehicle position information or based on the pose matching; and control automatic parking for the vehicle using the updated current vehicle position information, wherein detecting markers comprises filtering out duplicate pairs of markers from stored marker information, to obtain the identified pair of markers in a ground coordinate system, and wherein performing non-pose matching comprises:

a coarse matching sub-step of matching the identified pair of markers in the ground coordinate system with pairs of actual markers in the known fixed scenario coordinate system, and performing a coordinate system transformation matrix by solving an ICP algorithm by means of SVD decomposition, to obtain a first transformation matrix and a first error;

a fine matching sub-step of performing an inverse operation on the first transformation matrix obtained in the coarse matching sub-step, to find corresponding pairs of virtual markers, in the ground coordinate system, of the pairs of actual markers in the known fixed scenario coordinate system, filtering out matched pairs of virtual markers from the corresponding pairs of virtual markers, and computing another transformation matrix for other unmatched pairs of virtual markers and matched pairs of markers in the ground coordinate system, to obtain a second transformation matrix and a second error; and a selection sub-step of selecting, based on the first transformation matrix and the first error that are obtained in the coarse matching sub-step and the second transformation matrix and the second error that are obtained in the fine matching sub-step, a pair of markers from the transformation matrix with a small error as a matched pair of markers, and obtaining, based on the matched pair of markers, vehicle position information in the fixed scenario coordinate system as the latest vehicle position information.

5. The vehicle positioning system for a fixed parking scenario according to claim 4, wherein, to detect markers, the processor further executes the computer program to:

obtain markers based on a detection result for markers in an image or a tracking result for markers that are previously detected;

traverse the obtained markers to find out whether there are other markers within a certain range, and then obtain a plurality of markers if there are other markers; and determine whether there is a pair of markers in the plurality of markers, and store marker information as the stored marker information if there is a pair of markers.

6. The vehicle positioning system for a fixed parking scenario according to claim 4, wherein, to perform pose matching, the processor further executes the computer program to:

obtain a coordinate system transformation matrix from the ground coordinate system to the fixed scenario coordinate system based on the vehicle position information; and compute, based on the coordinate system transformation matrix, corresponding positions, in the fixed scenario coordinate system, of pairs of markers in the ground coordinate system, match the corresponding positions with the pairs of actual markers in the known fixed scenario coordinate system, and then use a position of a matched pair of markers in the fixed scenario coordinate system as the latest vehicle position information if a matching error is less than a preset matching threshold.

7. A vehicle, comprising a vehicle positioning system for a fixed parking scenario, wherein the vehicle positioning system comprises:

a computer readable medium comprising a computer program stored thereon; and a processor to execute the computer program to:

detect markers and identify a pair of markers;

perform pose matching based on vehicle position information of a vehicle and the pair of markers, wherein the vehicle position information comprises a point on an axle of the vehicle in a known fixed scenario coordinate system;

in the absence of the vehicle position information, perform non-pose matching based on the pair of markers, to obtain latest vehicle position information;

update current vehicle position information based on the latest vehicle position information or based on the pose matching; and control automatic parking for the vehicle using the updated current vehicle position information, wherein detecting markers comprises filtering out duplicate pairs of markers from stored marker information, to obtain the identified pair of markers in a ground coordinate system, and wherein performing non-pose matching comprises:

a coarse matching sub-step of matching the identified pair of markers in the ground coordinate system with pairs of actual markers in the known fixed scenario coordinate system, and performing a coordinate system transformation matrix by solving an ICP algorithm by means of SVD decomposition, to obtain a first transformation matrix and a first error;

a fine matching sub-step of performing an inverse operation on the first transformation matrix obtained in the coarse matching sub-step, to find corresponding pairs of virtual markers, in the ground coordinate system, of the pairs of actual markers in the known fixed scenario coordinate system, filtering out matched pairs of virtual markers from the corresponding pairs of virtual markers, and computing another transformation matrix for other unmatched pairs of virtual markers and matched pairs of markers in the ground coordinate system, to obtain a second transformation matrix and a second error; and a selection sub-step of selecting, based on the first transformation matrix and the first error that are obtained in the coarse matching sub-step and the second transformation matrix and the second error that are obtained in the fine matching sub-step, a pair of markers from the transformation matrix with a small error as a matched pair of markers, and obtaining, based on the matched pair of markers, vehicle position information in the fixed scenario coordinate system as the latest vehicle position information.

* * * * *